Patented Feb. 15, 1949

2,461,950

UNITED STATES PATENT OFFICE 2,461,950

2 OR 4-AMINO QUINAZOLINES

Frank J. Wolf, Westfield, N. J., assignor to Merck & Co., Inc., Rahway, N. J., a corporation of New Jersey No Drawing. Application January 18, 1946, Serial No. 642,129

7 Claims. (Cl. 260—250)

This invention relates to certain useful substituted quinazolines, and to methods by which they may be prepared. More particularly, it relates to the 2- and 4-aminoquinazolines, new chemical compounds useful in themselves, and as starting materials for the manufacture of certain therapeutically useful sulfanilamidoquinazolines which are described and claimed in my copending application, Serial No. 627,785, filed November 9, 1945.

I have found that certain aminoquinazolines, more particularly the 2- and 4-substituted aminoquinazolines represented by the structural formulae:

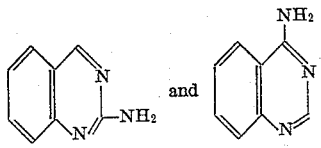

may be readily prepared by reacting the corresponding 2- and 4-haloquinazolines with ammonia. Preferably a halo derivative, such as 2-chloroquinazoline, or 4-chloroquinazoline, is reacted with anhydrous ammonia dissolved in an inert organic liquid such as methanol. The new compounds are useful in themselves wherever quinazoline-type compounds are utilizable, and may be employed as intermediates or starting materials in the manufacture of therapeutically active compounds such as the sulfanilamidoquinazolines.

In preparing the new chemical compounds 2-haloquinazoline or 4-haloquinazoline, as, for example, 2-chloroquinazoline or 4-chloroquinazoline, is reacted with anhydrous ammonia. The reaction is preferably carried out by heating the haloquinazoline with an inert solvent, such as methanol, into which anhydrous ammonia gas has been passed. Upon evaporation to dryness the 2-aminoquinazoline or 4-aminoquinazoline remains behind in the form of a solid residue.

2-aminoquinazoline is a white powdery material having a melting point of 204–206° C. 4-aminoquinazoline is a white powdery material having a melting point of 267–269° C. Both are capable of crystallization by suitable treatment.

The new chemical compounds, and the process by which they may be prepared, are exemplified by the following illustrative examples.

Example 1

The compound 2-chloroquinazoline was prepared by the method described in Berichte, vol. 29, page 1313 (1896). 4.5 grams of this compound were heated in a sealed tube with 20 milliliters of methanol which had previously been saturated with anhydrous ammonia at 25° C. The heating was continued at 100° C. for 5 hours, after which time the reaction mixture was concentrated to dryness. The solid residue was dissolved in 20 milliliters of 5% hydrochloric acid solution and the acid solution extracted with ether to remove impurities. When the solution was rendered alkaline with sodium hydroxide solution 2-aminoquinazoline was secured. This more or less crude product was purified by recrystallization from ethanol.

The pure product, a white powder, had a melting point of 204–206° C.

Example 2

The compound 4-chloroquinazoline was prepared as described in Berichte, vol. 29, page 1313 (1896). This was suspended in 500 milliliters of methanol containing 60 grams of ammonia, and heated in a glass-lined steel bomb at 100° C. for three hours. The mixture was then concentrated to dryness and the residue dissolved in hot 2% hydrochloric acid. The solution was then treated with decolorizing carbon, and 4-aminoquinazoline precipitated by the addition of sodium hydroxide solution. The yield was 57% of theoretical, and the new chemical compound, in the form of a white powder, melted at 267–269° C. After recrystallization from isopropyl alcohol.

The foregoing description and examples are intended to be illustrative only. Modifications of, or variations therefrom, which conform to the spirit of the invention are intended to be within the scope of the appended claims.

This application is a continuation in part of my copending application, Serial No. 627,785, filed November 9, 1945.

I claim:

1. A compound having the formula:

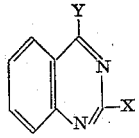

where X and Y each represent a substituent selected from the group which consists of hydrogen and NH$_2$, the substituents being different.

2. 2-aminoquinazoline.

3. 4-aminoquinazoline.

4. The method of preparing a compound selected from the group which consists of 2-aminoquinazoline and 4-aminoquinazoline, which comprises reacting a compound selected from the group which consists of 2-haloquinazoline and 4-haloquinazoline with alcoholic ammonia.

5. The method of preparing a compound of the structure:

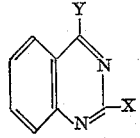

where X and Y each represent a substituent selected from the group which consists of hydrogen and NH₂, the substituents being different, which comprises reacting with ammonia a compound having the structure:

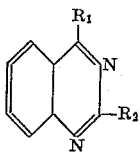

where R₁ and R₂ are selected from the group consisting of halogen and hydrogen, said substituents being different.

6. The method of preparing 2-aminoquinazoline which comprises reacting 2-chloroquinazoline with alcoholic ammonia.

7. The method of preparing 4-aminoquinazoline which comprises reacting 2-chloroquinazoline with alcoholic ammonia.

FRANK J. WOLF.

REFERENCES CITED

The following references are of record in the file of this patent:

Journal of the Chemical Society (1944), page 621.